Nov. 6, 1962

C. B. VOGEL ETAL 3,062,314

WELL LOGGING

Filed June 30, 1958

TIME

INVENTORS:
CHARLES B. VOGEL
THOMAS W. LAMB
BY: *James Poderovic*
THEIR ATTORNEY

INVENTORS:
CHARLES B. VOGEL
THOMAS W. LAMB
BY: James Todorovic
THEIR ATTORNEY

United States Patent Office 3,062,314
Patented Nov. 6, 1962

3,062,314
WELL LOGGING
Charles B. Vogel and Thomas W. Lamb, Houston, Tex., assignors to Shell Oil Company, New York, N.Y., a corporation of Delaware
Filed June 30, 1958, Ser. No. 745,351
6 Claims. (Cl. 181—.5)

This invention pertains to well logging equipment and more particularly to a means for switching off the signal from each receiver of a plurality of receivers used in acoustical well logging equipment after they have transmitted their signal.

Acoustical well logging equipment to which this invention pertains is shown and described in Patents 2,651,027 and 2,708,485. Acoustical or velocity logging equipment consists of a transmitter for generating an acoustical impulse and two or more receivers which are spaced from the transmitter. The acoustical signal generated by the transmitter travels through the formation surrounding the well borehole and is received at each receiver where it is converted to a fluctuating electric signal and transmitted to the surface. Both the time of arrival of the acoustical impulse at each receiver as well as the shape of the initial fluctuations are important in well logging. Hertofore it has been assumed that the acoustical impulses generate a fluctuating signal which had a large initial magnitude and then decreases with time. Thus, it was customary to send the signals from the two receivers over the same transmission circuit to the surface without attempting to separate the signal or to eliminate the transmission of either receiver.

Based on many actual tests it was discovered that the signals from the two receivers tend to overlap and intermingle thus, making it difficult to determine the actual time of arrival of the acoustical impulse at receivers subsequent to the receiver nearest the transmitter as well as the shape of the initial portion of the signal from these receivers. Furthermore, it was discovered that the initial signal had a very small amplitude and increased slowly to a large amplitude after which it decayed. This contributed further to the intermixing of the signals since one receiver was transmitting a signal of large amplitude when the impulse reached the next receiver. In order to overcome the problem of intermixing of the two signals, it has been suggested in the prior art to switch off a receiver after the acoustical impulse has passed the receiver and prior to its arrival at the next receiver. Various switching means including both relays and electronic circuits which are actuated by the generation of an impulse by the transmitter have been proposed for this purpose. All of these various switching means have utilized an operator at the surface of the well for varying the time delay between the generating of an acoustical impulse and the switching off of the receiver. The operator observed the trace of the signal transmitted from the receivers on an oscilloscope and regulated the time of the switching off of the receivers accordingly.

While the above described means for switching off the receiver nearest the transmitter is satisfactory it has the disadvantage in that it required an operator to vary the time delay between the generating of an acoustical impulse and the switching off of the receivers. Furthermore, the time of switching off does not depend upon the arrival of the signal at the nearest receiver but rather the setting of the operator, thus it is possible to have intermixing of the signals in some cases. This intermixing of signals will result if the receiver is switched off when the signal is at a large value, in which case the decay of the signal will cause the receiver to transmit a switch tail even though it has been switched off. This switch tail will in some cases overlap the signal from the second receiver and cause distortion of this signal due to the intermixing of the signals. The distortion due to a switch tail is particularly objectionable when the receivers are spaced at short intervals. Short intervals are necessary in many cases in order to detect very thin streaks of a particular type of formation along a well bore.

Accordingly, the principal object of this invention is to provide a means for switching off a receiver after the acoustical impulse has been received by the receiver, which is responsive to the receipt of the signal by the receiver.

A further object of this invention is to provide a means for switching off a receiver after it has transmitted at least one fluctuation of the signal and returned to a substantial zero amplitude in order to avoid any further transmission of the signal.

A still further object of this invention is to provide a switching means for switching off the nearest receiver which is actuated by the receiving of a signal by the receiver itself rather than by the elapse of a predetermined time period from the time of generation of the acoustical impulse.

The above objects and additional advantages of this invention are achieved by providing a means for pre-amplifying a signal from a receiver and then further amplifying and transmitting it to the surface. The output from the preamplifier stage in addition to being supplied to the final amplifier stage is used as a pulse to actuate a trigger circuit for switching off the final amplifier after it has transmitted at least one fluctuation of the receiver signal and returned to a zero amplitude. Of course in some cases it may not be necessary to use a preamplifier stage since the signal generated by the receiver will have sufficient amplitude to actuate the trigger circuit.

The above objects will be more easily understood by those skilled in the art by the following detailed description of a preferred embodiment of this invention when taken in conjunction with the attached drawing in which.

Figure 1:
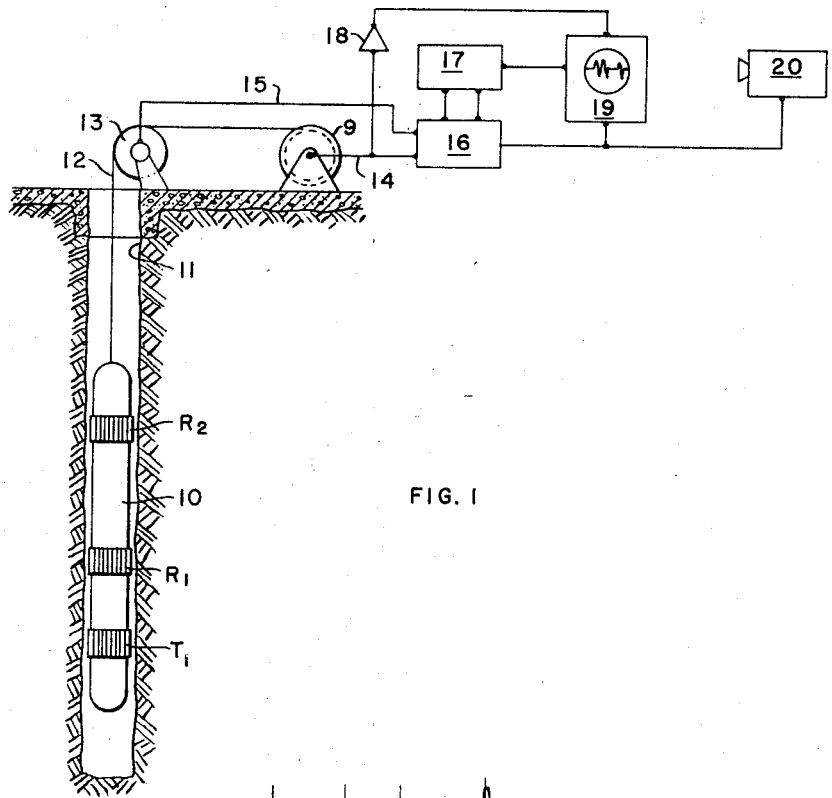
FIGURE 1 is a diagrammatic view of a well logging apparatus.

Referring now to FIGURE 1 there is shown a downhole instrument 10 which includes a transmitter $T_1$ at its lower end and two receivers $R_1$ and $R_2$ vertically spaced above the transmitter. The downhole instrument is lowered into the well bore 11 by means of a conductor cable 12 which is stored on a reel 9 and run over a measuring sheave 13 as the instrument is lowered into the well. The signals from the receivers $R_1$ and $R_2$ as well as from the measuring sheave 13 are supplied to a control circuit 16 by means of leads 14 and 15. The control circuit controls the oscilloscope 19, camera 20 and delay circuit 17 in addition to supplying timing mark signals to the oscilloscope 19. The delay circuit 17 delays the signal from the receivers $R_1$ and $R_2$ until the control circuit 16 has started the sweep of the oscilloscope to insure that the signals appear on the trace of the oscilloscope. The signal trace appearing on the oscilloscope is photographed by a recording camera 20 so that the records can be examined later in greater detail. The above described logging equipment is more fully illustrated and described in the reference patents and, of course, many modifications or changes are known to those working in the field of velocity well logging.

Figure 2:
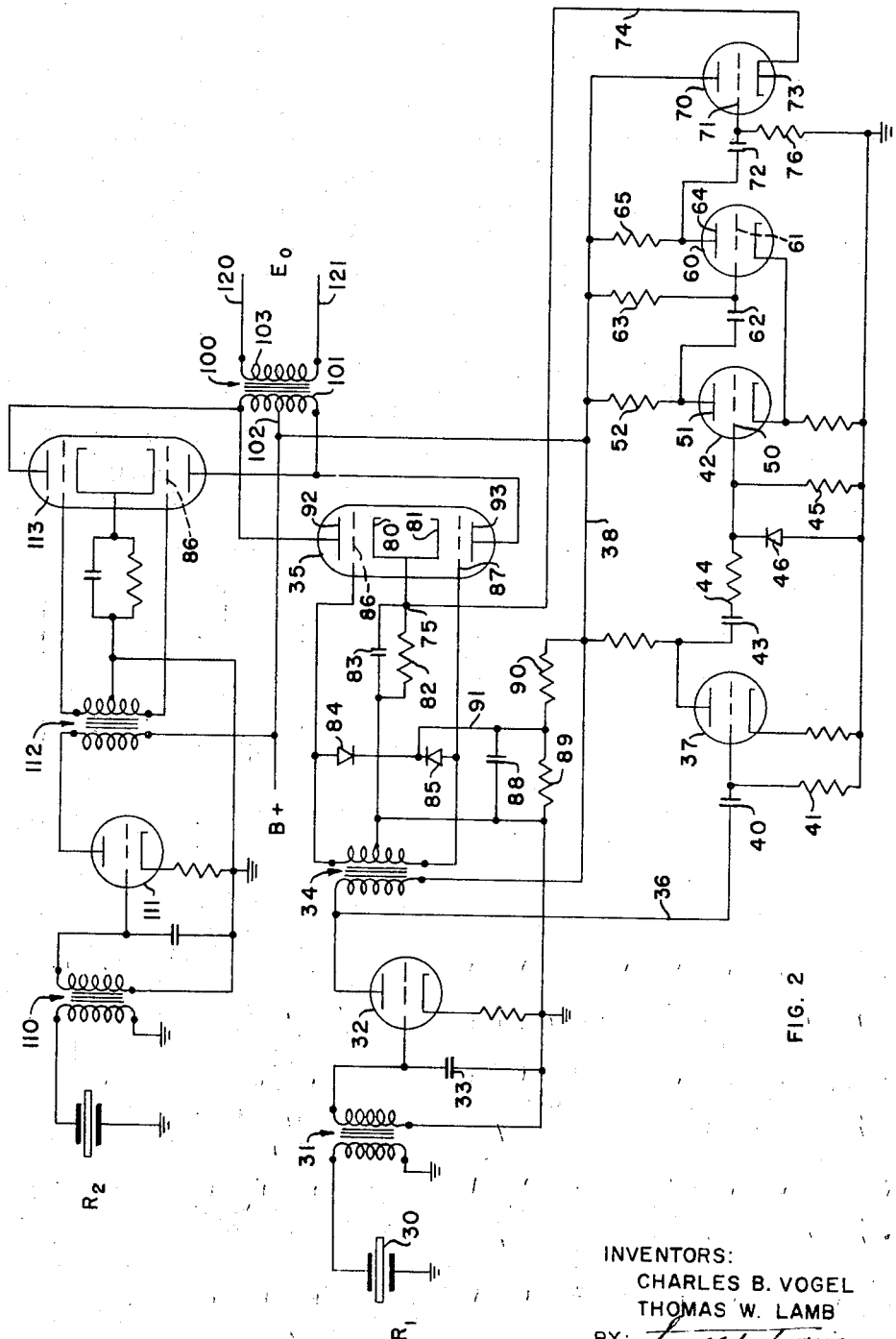
FIGURE 2 is a schematic diagram of the circuit used in this invention.

Referring now to FIGURE 2 the receiver $R_1$ is illustrated as a piezoelectric crystal 30 one side of which is grounded and the other side of which is connected to the primary of the transformer 31. While a piezoelectric crystal is shown, of course, any other type transducer which is capable of converting the acoustical impulse to a fluctuating electric signal could also be used, such as, a magnetostrictive device. The secondary of the transformer 31 is coupled to the grid of the triode forming the preamplifier 32 through a blocking capacitor 33. The signal from the preamplifier 32 is connected to one end of the primary of the transformer 34 whose opposite end is connected to the positive power supply bus 38. The signal of the preamplifier 32 is also connected to an additional amplifier stage 37 of the trigger circuit by means of a lead 36, a filter capacitor 40 and grid resistor 41. The signal from the preamplifier stage 37 is coupled to the grid of the tube 42 through a capacitor 43, a series connected resistor 44 and a grid or by-pass resistor 45. A blocking diode 46 is disposed in a parallel connection with the by-pass resistor 45 in order to provide a path to ground for negative pulses from the amplifier 37. This insures that only positive pulses will be applied to the grid 50 of the triode 42 to actuate the trigger circuit. The plate 51 of the triode 42 is connected to the positive power supply bus 38 through a resistance 52 and to the grid 61 of the second triode 60 through a filter capacitor 62 and the by-pass resistor 63 which is disposed in a parallel relationship with the plate resistor 52 for the tube 42. Plate 64 of the tube 60 is coupled to the grid 71 of the cathode follower circuit 70 through a capacitor 72 and a grid resistor 76.

From the above description it can be appreciated that the triodes 42 and 60 form a switching circuit which is more commonly known as a Schmidtt trigger circuit. In this type of circuit when a positive pulse having predetermined threshold voltage is supplied by the amplifier 37 to the grid of the tube 42 the tube 42 will conduct. When the tube 42 conducts the capacitor 62 will discharge through the tube 42 thus lowering the positive potential on the grid 61 of the tube 60 to cut off the tube 60. When the tube 60 is extinguished the voltage drop across the plate resistor 65 will be lowered thus increasing the positive bias on the grid 71 of the cathode follower 70 to cause the cathode follower to conduct. The tube 42 will conduct until the capacitor 62 discharges after which the capacitor will commence to charge and apply a positive bias to the grid 61 of the tube 60. This will cause tube 60 to conduct and extinguish tube 42 and the cathode follower 70. The duration of the conductance of tube 42 can be controlled by varying the time constant of the capacitor 62 and resistor 63. This time constant should, of course, be long enough to insure that the second receiver $R_2$ has received the acoustical impulse and transmitted its signal. The value of resistor 65 should be relatively small in order to apply a high positive potential to the grid 71 of the cathode follower 70.

The cathode 73 of the cathode follower circuit 70 is connected by means of a lead 74 to a junction 75 of the two series connected cathodes 80 and 81 of the push-pull amplifier 35. The grids 86 and 87 of the push-pull amplifier 35 are connected to the opposite ends of the secondary of the transformer 34. The cathodes 80 and 81 are also connected to ground through a parallel resistance capacitance circuit having a capacitor 83 and resistance 82 disposed therein. Thus, the large positive pulse from the trigger circuit as amplified by the cathode follower 70 will be applied to the cathodes 80 and 81 to switch off the push-pull amplifier 35 by increasing the negative bias on the grids.

Two diodes 84 and 85 are connected in opposition to each other and in parallel with the secondary of the transformer 34 in order to limit the amplitude of the signal supplied by the preamplifier 32 to the amplifier 35. This insures that the positive potential from the cathode follower 70 will always have sufficient amplitude to drive the amplifier 35 to cut off. The common connection between the diodes 84 and 85 are connected to the positive power supply by means of lead 91 and a voltage divider consisting of resistance 89 and 90. To insure a good path to ground for any alternating signal which is passed by the diodes 84 and 85 a large capacitor 88 is disposed in parallel with the resistance 89. It is necessary as will be explained below to use a limiting circuit ahead of the push-pull amplifier 35 because the signal from the receiver $R_1$ achieves a large amplitude and in some cases it may be impossible to drive the amplifier 35 to cut off.

The plates 92 and 93 of the push-pull amplifier are connected to the opposite ends of the primary 101 of an output transformer 100. The center tap 102 of the output transformer is connected to the positive power supply while the secondary 103 is connected by means of leads 120 and 121 to the conductor cable 12 shown in FIGURE 1.

The second receiver $R_2$ shown in FIGURE 1 is also provided with a suitable transducer shown in FIGURE 2 as a piezoelectric crystal. The output from the piezoelectric crystal is coupled to the preamplifier 111 by means of a transformer 110. The preamplifier 111 in turn is coupled to push-pull amplifier 113 through a transformer 112 with the output of the push-pull amplifier being connected to the opposite ends of the primary 101 of the transformer 100. The structure of the preamplifier 111 and the push-pull amplifier 113 is substantially the same as the preamplifier 32 and the push-pull amplifier 35, respectively, and will not be described in detail.

Figure 3:
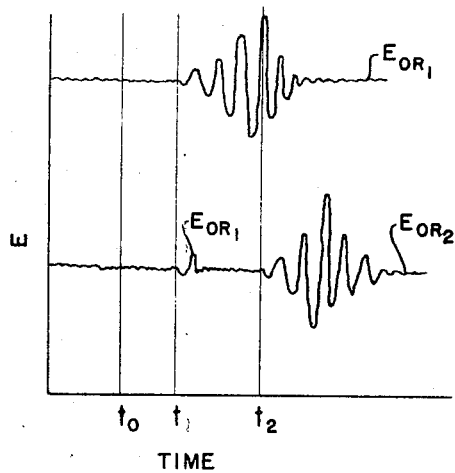
FIGURE 3 is a graph showing the variation in amplitude of receiver signals with respect to time.

Referring to FIGURE 3 where the vertical axis represents signal magnitude and the horizontal axis represents time there is shown a trace $E_{OR_1}$ from the oscilloscope 19 which represents the trace of a complete signal from a single receiver such as $R_1$. On inspection of this trace it can be seen that the signal has a low initial amplitude and then increases to a large amplitude and then slowly decays to substantially zero value. It should also be noted that the signal starts as a negative going signal and then changes to a positive signal. This is necessary in order to insure that a complete half cycle of the signal is transmitted before the trigger circuit cuts off the amplifier 35. It has been discovered that all velocity logging receivers generate a fluctuating electrical signal which has the same initial polarity, thus one only has to reverse the connections between the receiver $R_1$ and the transformer 31 in order to apply an initially negative going signal to the preamplifier stage in case it is initially positive. The need for an initially negative going signal from the receiver can easily be seen by inspecting the circuit shown in FIGURE 2. Each tube shown will supply an output signal which has the exact opposite phase of the input signal and since it is necessary to have a positive output signal from the cathode follower 73, this means a negative input signal must be supplied to the preamplifier 32.

The second trace shown in FIGURE 3 represents a complete trace of a signal transmitted by this invention including a portion of the signal $E_{OR_1}$ and a complete signal $E_{RO_2}$ transmitted by the receiver $R_2$. From an inspection of this trace it can be seen that the signal from the receiver $R_2$ commences at a time when the signal from the receiver $R_1$ has a substantially maximum amplitude. Thus, if the receiver $R_1$ was not switched off prior to the transmission of the signal from the receiver $R_2$ the initial fluctuation of the signal from the receiver $R_2$ would be completely obliterated by the signal from the receiver $R_1$. The marks $t_0$, $t_1$ and $t_2$ along the horizontal axis denote the generation of the acoustical impulse by the transmitter $T_1$ and its receipt by the receivers $R_1$ and $R_2$, respectively. It is the time interval between the generation of the acoustical impulse and its receipt by each of the receivers $R_1$ and $R_2$ which is important in velocity well logging, since it indicates the type of formation surrounding the borehole.

From the above description it can be appreciated that this invention has provided a simple means for switching off the receiver $R_1$ after it has transmitted the initial fluctuation of a signal generated by the acoustical impulse. This switching is accomplished by utilizing the initial portion of the signal from the receiver $R_1$ as a pulse to trigger the trigger circuit consisting of triodes 42 and 60. The trigger circuit in turn supplies a positive bias to the cathode of the push-pull output stage of the receiver $R_1$ which effectively silences this receiver by increasing the negative bias on the grid. By using a pulse generated by the receiver $R_1$ to trigger the trigger circuit which in turn switches off the receiver this invention avoids the disadvantage of having a preselected time delay between the generation of the acoustical impulse and the switching off of the nearest receiver. It is not necessary when using the circuit of this invention to reset the time delay of the switch means when the logging equipment is used in various well holes which have various formations surrounding them. As explained in the introduction constant attention is necessary where the switching is made dependent upon a predetermined time delay between the generation of the acoustical impulse and the silencing of the nearest receiver. Furthermore, switch means dependent upon predetermined time delays can at times transmit too much of the signal from the near receiver which will tend to obliterate the initial portion of the signal from the second receiver, especially in cases where receivers are closely spaced. Since the time of arrival of the acoustical impulse at the two receivers is the most important information obtained from a velocity well log this renders such logs substantially useless.

As seen in FIGURE 3 the signal from the downhole instrument 10 as reproduced on the oscilloscope includes some background noise. Thus the threshold voltage of the trigger circuit should be set so that it is substantially impossible for the background noise to trigger the circuit. As explained above the trigger circuit operates when it receives an input signal of the proper polarity and sufficient amplitude. Accordingly, if the signal from the receiver is applied to the first stage of the circuit so that in response to this signal the first stage supplies a signal of the wrong polarity to the trigger circuit, the circuit will always transmit a complete half cycle of the signal before the trigger circuit cuts off the output amplifier. The delay time of the trigger circuit is very small which results in substantially instantaneous cut off of the output amplifier after the receiver signal has the correct polarity and sufficient magnitude. This is shown in FIGURE 3 where the signal from $R_1$ is cut off as soon as it has exceeded the noise level while going in a positive direction. Thus this invention provides a simple circuit triggered by the receiver signal for silencing the receiver after it has transmitted at least a half cycle of the signal. In addition the receiver is silenced when the magnitude of its signal only slightly exceeds the noise level so that any switch tail on the receiver signal is eliminated.

While a push-pull amplifier 35 is shown in the final stage it could be replaced with other types of amplifiers such as single ended or class A or B amplifiers. A push-pull amplifier is preferred since it will amplify both the positive and negative portions of the receiver signal. This will permit one to examine the recording and determine if the first receiver was silenced after it produced only a half cycle or after it produced one and a half cycles. Also in some cases it is desirable to modify a portion of the receiver signal in order that it may be used to operate a gate circuit or similar circuit in the recording equipment.

While but one particular circuit has been described for switching off the near receiver various modifications of this circuit will appear to those skilled in the art, for example, various types of amplifier and trigger circuits may be used in place of amplifiers 32 and 35 and trigger circuit of the triodes 42 and 60. Also this invention can easily be adapted to silence a plurality of receivers in succession since the actual receiver signal is used to silence the receiver. This was not possible in systems which depend on time delay means actuated by the generation of an acoustical impulse to silence a receiver since it would require the controlling of a plurality of time delays in order to successfully separate the signals from various receivers. Thus the above description is intended to be merely descriptive and this invention should not be limited to the details described but only its broad spirit and scope.

We claim as our invention:
1. A seismic well logging instrument comprising:
   means for transmitting seismic impulses;
   at least two spaced receivers for receiving said impulses and producing a transient voltage pulse;
   a first normally conducting amplifier means, one of said receivers being coupled to said first amplifier means;
   a trigger circuit, said trigger circuit being coupled to both said one receiver and said first amplifier means, to return said first amplifier means to a non-conducting condition after said first amplifier means has reproduced at least a half cycle of said first receiver voltage pulse;
   a second normally conducting amplifier, the other of said receivers being coupled to said second normally conducting amplifier;
   an indicating means, said first and second normally conducting amplifier means being coupled to said indicating means.
2. A circuit for amplifying the pulses received at two receivers spaced unequal distances from a seismic pulse transmitter comprising:
   a first normally conducting amplifier means, said first amplifier being coupled to the receiver that first receives the seismic pulse;
   a second normally conducting amplifier means and a trigger circuit, said first amplifier being coupled to both said second amplifier means and said trigger circuit, said trigger circuit returning said second amplifier means to a non-conducting condition after the second amplifier means has produced at least a half cycle of the pulse from said above mentioned receiver;
   a third normally conducting amplifier means, the other receiver being coupled to said third amplifier means;
   an indicating means, said second and third amplifier means being coupled to said indicating means.
3. An acoustical well-logging system comprising:
   a transmitter for producing acoustical impulses;
   at least two spaced receivers, each of said receivers being capable of receiving said acoustical impulses and converting them to fluctuating electrical signals;
   a first and second normally conducting amplifier means, said two receivers being coupled to said first and second amplifier means respectively;
   a circuit means, said first and second amplifiers being coupled to said circuit means to transmit the amplified fluctuating signals to a use location;
   a trigger circuit, at least one of said receivers being coupled to said trigger circuit and said trigger circuit being coupled to the amplifying means coupled to said one receiver to effectively silence said one receiver after the production of the initial one half cycle of said fluctuating signal.
4. A trigger circuit for effectively silencing a normally conducting amplifier of the receiver used in an acoustical well logging system comprising:
   an electronic trigger circuit, said trigger circuit being coupled to the receiver and to the normally conducting amplifier to bias the amplifier beyond its cut-off point;
   said trigger circuit in addition being disposed to be actuated by a pulse of predetermined polarity and magnitude resulting from an acoustical signal received by the receiver, the predetermined polarity and magnitude of said pulse being chosen to permit the amplifier to reproduce the first half cycle of the receiver signal.

5. A downhole instrument for acoustical well logging comprising:
- a receiver capable of receiving and converting an acoustical impulse into an alternating electrical signal;
- a normally conducting amplifying circuit, said receiver being coupled to said amplifying circuit;
- a trigger circuit, said trigger circuit being coupled to said amplifying circuit to effectively silence said amplifying circuit, said trigger circuit being actuated by a signal of predetermined polarity and magnitude, the polarity of said signal being chosen to actuate said trigger circuit after the amplifying circuit has reproduced at least a half cycle of the electrical signal from the receiver and the magnitude being set slightly above the noise level of the downhole instrument.

6. A downhole instrument for acoustical well logging comprising:
- a receiver capable of receiving and converting an acoustical impulse into an alternating electrical signal;
- a normally conducting amplifying circuit, said receiver being coupled to said amplifying circuit;
- a trigger circuit, said receiver being coupled to said trigger circuit, said trigger circuit being coupled to said amplifying circuit to effectively bias said amplifying circuit beyond its cut-off level, and said trigger circuit being actuated by a signal of predetermined polarity and magnitude, the polarity of said signal being chosen to permit the amplifying circuit to reproduce at least a half cycle of the electrical signal from the receiver and the magnitude being set slightly above the noise level of the downhole instrument.

References Cited in the file of this patent
UNITED STATES PATENTS

| | | |
|---|---|---|
| 2,207,281 | Athy et al. | July 9, 1940 |
| 2,569,827 | Paulsen | Oct. 2, 1951 |
| 2,691,422 | Summers et al. | Oct. 12, 1954 |
| 2,708,485 | Vogel | May 17, 1955 |
| 2,723,346 | Magnuson | Nov. 8, 1955 |
| 2,767,310 | Walker | Oct. 16, 1956 |
| 2,813,590 | McDonald | Nov. 19, 1957 |
| 2,931,455 | Loofbourrow | Apr. 5, 1960 |

Notice of Adverse Decision in Interference

In Interference No. 93,516 involving Patent No. 3,062,314, C. B. Vogel and T. W. Lamb, WELL LOGGING, final judgment adverse to the patentees was rendered Dec. 29, 1965, as to claim 5.

[*Official Gazette August 9, 1966.*]